(12) United States Patent
Bruhn et al.

(10) Patent No.: US 11,933,387 B2
(45) Date of Patent: Mar. 19, 2024

(54) ELECTROMOTIVE ACTUATOR TO ADJUST HEIGHT WITH FRICTION SLEEVE

(71) Applicant: NIDEC Motors & Actuators (Germany) GmbH, Bietigheim-Bissingen (DE)

(72) Inventors: Rainer Bruhn, Ingersheim (DE); Martin Spielmann, Schwaigern (DE)

(73) Assignee: NIDEC MOTORS & AUCTUATORS (GERMANY) GMBH, Bietigheim-Bissingen (DE)

(*) Notice: Subject to any disclaimer, the term of this patent is extended or adjusted under 35 U.S.C. 154(b) by 0 days.

(21) Appl. No.: 17/726,750

(22) Filed: Apr. 22, 2022

(65) Prior Publication Data
US 2022/0338616 A1    Oct. 27, 2022

(30) Foreign Application Priority Data
Apr. 23, 2021  (DE) .................. 102021110464.5

(51) Int. Cl.
| | |
|---|---|
| *F16H 25/24* | (2006.01) |
| *H02K 7/102* | (2006.01) |
| *F16H 1/16* | (2006.01) |
| *F16H 55/14* | (2006.01) |
| *H02K 7/116* | (2006.01) |

(52) U.S. Cl.
CPC ......... *F16H 25/2454* (2013.01); *H02K 7/102* (2013.01); *F16H 1/16* (2013.01); *F16H 55/14* (2013.01); *H02K 7/1166* (2013.01)

(58) Field of Classification Search
CPC ...... F16H 25/24; H02K 7/102; H02K 7/1166; A47B 88/473
See application file for complete search history.

(56) References Cited

U.S. PATENT DOCUMENTS

| | | | |
|---|---|---|---|
| 9,121,213 B2 * | 9/2015 | Sakai | ............... E05F 3/22 |
| 9,444,305 B2 * | 9/2016 | Wu | ............... H02K 7/1166 |
| 2022/0001917 A1 | 1/2022 | Zimmermann et al. | |

FOREIGN PATENT DOCUMENTS

| | | | | |
|---|---|---|---|---|
| DE | 10 2007 046 161 A1 | 4/2009 | | |
| DE | 102008061117 A1 * | 6/2010 | ............ | E05F 1/1058 |
| DE | 102014221699 A1 * | 4/2016 | ............... | A47B 9/04 |
| DE | 10 2018 217 459 A1 | 4/2020 | | |

* cited by examiner

*Primary Examiner* — Bobby Rushing, Jr.
(74) *Attorney, Agent, or Firm* — Keating & Bennett, LLP

(57) ABSTRACT

An electromotive actuator to adjust a height includes an electric motor with a motor shaft, a helical gear assembly operatively connected to the motor shaft, a sleeve-shaped friction brake to act on the motor shaft, and a housing surrounding the electric motor or the helical gear assembly and including a seat of the friction brake. The friction brake includes an opening extending in a radial direction relative to a longitudinal axis of the motor shaft such that the friction brake is attachable to the motor shaft perpendicular to the longitudinal axis.

13 Claims, 6 Drawing Sheets

ELECTROMOTIVE ACTUATOR TO ADJUST HEIGHT WITH FRICTION SLEEVE

CROSS REFERENCE TO RELATED APPLICATION

The present application claims priority under 35 U.S.C. § 119 to German Application No. 10 2021 110 464.5, filed on Apr. 23, 2021, the entire contents of which are hereby incorporated herein by reference.

1. FIELD OF THE INVENTION

The present disclosure relates to an actuator to provide electromotive height adjustment, as well as to a height-adjustable table including such an actuator.

2. BACKGROUND

Actuators for electromotive height adjustment are used, for example, to continuously adjust the height of tables between a sitting position and a standing position. It is also known to use such actuators for height adjustment of roller shutters or sun protection devices, such as awnings. The actuators conventionally have a self-locking worm gear, so that when no more current is applied to the motor, the object to be moved can be held in the selected position. Due to the requirement that the adjustment speed of the actuator should be significantly faster than previously known, the gear ratio must be reduced. This means that the required self-locking can no longer be realized by a gear design.

SUMMARY

Example embodiments of the present disclosure provide electromotive actuators to adjust a height to achieve sufficient self-locking to prevent an object to be moved from moving due to a weight force when a motor is de-energized.

An example embodiment of the present disclosure provides an electromotive actuator to adjust a height, and a height-adjustable table. The present example embodiment provides an electromotive actuator to adjust a height and including an electric motor with a motor shaft, a helical gear assembly including a worm gear operatively connected to the motor shaft, a sleeve-shaped friction brake to act on the motor shaft, and a housing surrounding the electric motor or the helical gear assembly is provided with a seat of the friction brake, the friction brake including an opening extending in a radial direction relative to a longitudinal axis of the motor shaft, such that the friction brake is attachable to the motor shaft perpendicular to the longitudinal axis.

The friction brake provides an additional frictional torque to prevent the motor shaft from running off. Since the motor shaft can rotate in the friction brake, there is minimal friction loss at the motor. Usually, the motor is brought to a standstill by a winding short circuit when it is switched off. At standstill, the total friction is greater due to the static friction of the friction brake. The effectiveness of the friction brake is thus significantly greater, since the braking torque at standstill is significantly greater than with the sliding friction during operation of the motor.

Such a slotted sleeve-shaped friction brake can be easily mounted on the motor shaft.

Preferably, the friction brake has an outer diameter that is larger than an inner diameter of the housing in the area of the seat, so that the friction brake is seated in the housing under preload and thus lies directly in contact with the housing. This makes the friction brake particularly quiet.

It is also advantageous if the friction brake includes an anti-rotation device that defines the position of the friction brake in the housing.

It is preferred if the anti-rotation device on the outside of the friction brake includes a projection that cooperates with a recess in the housing in the area of the seat.

Preferably, the friction brake is at least partially spring-loaded so that the frictional force can readjust over its service life.

It is further advantageous if the friction brake includes a friction surface in the opening which includes grooves extending in the longitudinal direction (parallel or substantially parallel to the longitudinal axis of the motor shaft) and evenly spaced, and webs defined by the grooves with inner sides in contact with the motor shaft to provide a frictional resistance against the rotary drive force of the electric motor. As a result, the grooves can be used as a reservoir of lubricant.

Preferably, the friction brake is in the gear housing and is located between the screw or worm and the motor housing on the motor shaft.

In an example embodiment of the present disclosure, the friction brake is defined by a one-piece brake made of plastic, in particular heat-resistant plastic. In this case, the brake can include an outer wall and an inner wall, which are separated from one another by a circumferential air gap, the opening defining the inner wall and the friction surface being on the inside of the inner wall. The friction force can be adjusted by selecting the wall thicknesses of the inner wall and outer wall and a compression rate on the outer diameter. The brake preferably applies an additional frictional torque in a range of about 0.01 Nm to about 0.02 Nm, in particular about 0.015 Nm, to the motor shaft.

Preferably, the brake includes longitudinally extending ribs on the outside which are evenly spaced along the circumference, one of the ribs defining the projection of the anti-rotation device.

The friction brake may also be defined by a one-piece brake and an elastic body surrounding the braking element on the circumferential side. It is advantageous if the brake includes webs on the outside and the elastic body includes corresponding recesses on the inside in such a way that the brake has a rotationally fixed connection with the elastic body. The elastic body can then be inserted into the housing under pretension.

In general, it is advantageous if the brake is between about 10 mm and about 15 mm high in the longitudinal direction, in particular about 12 mm. Then the brake can provide the additional frictional torque required to hold the object to be moved. The brake preferably applies an additional frictional torque in a range of about 0.01 Nm to about 0.02 Nm, in particular about 0.015 Nm, to the motor shaft.

A height-adjustable table with an actuator described above is also provided. The table preferably includes a weight in a range of about 100 kg to about 140 kg, in particular about 120 kg.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are explained in more detail below with reference to the drawings. Identical or functionally identical components are provided with the same reference signs across the figures.

DETAILED DESCRIPTION

Figure 1:
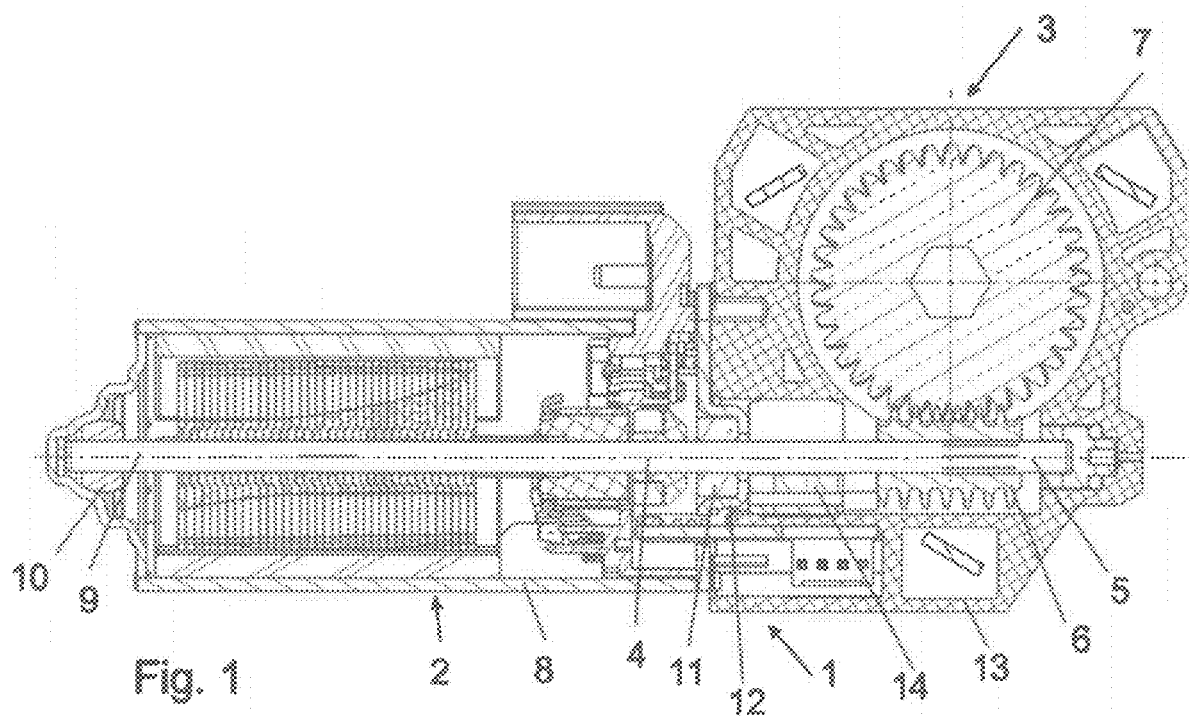
FIG. 1 shows a longitudinal section through an actuator to adjust a height with a one-piece friction brake according to an example embodiment of the present disclosure.

FIG. 1 shows an actuator to adjust a height 1 with an electric motor 2 and a helical gear assembly 3 in the form of a worm gear assembly. The electric motor 2 has a motor shaft 4, which is in the form of a worm 6 in an end region 5 and meshes with a worm wheel 7 of the worm gear assembly 3. The motor shaft 4 is rotatably mounted in an electric motor housing 8 surrounding the electric motor 2. For this purpose, the motor shaft 4 is supported in a first bearing 10 at an end 9 remote from the gearbox and in a second bearing 11, which is seated in a cover 12 of the electric motor housing 8. Adjacent to the cover of the electric motor housing 12 is a gear housing 13 surrounding the worm gear 3. The end region 5 of the motor shaft 4, which is formed as a worm 6, is located in the gear housing 13. A friction brake 14 is arranged between the end region 5 and the cover of the electric motor housing 12. The friction brake 14 at least partially surrounds the motor shaft 4 on the circumferential side and is designed in such a way that movement of the object to be adjusted in height is prevented after the electric motor has come to a standstill. For this purpose, the friction brake 14 acts on the motor shaft 4 with static friction, which increases the armature inhibiting torque.

Figure 2:
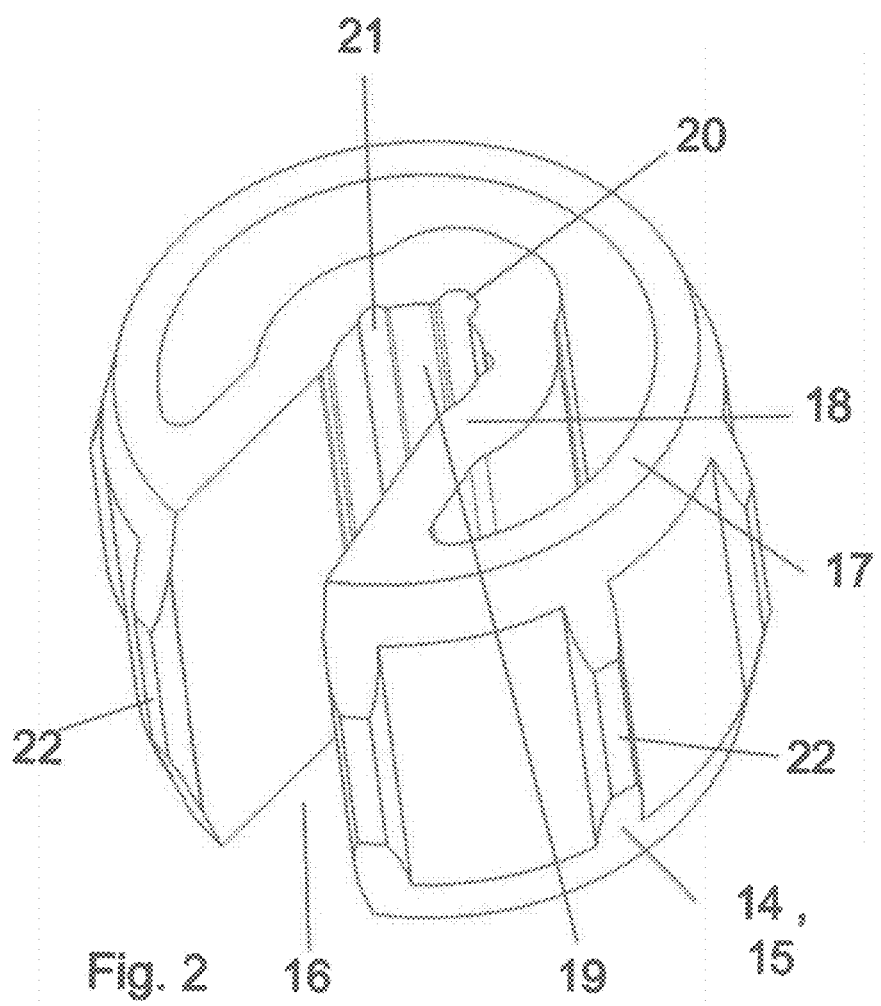
FIG. 2 shows a spatial view of the friction brake of FIG. 1.
Figure 3:
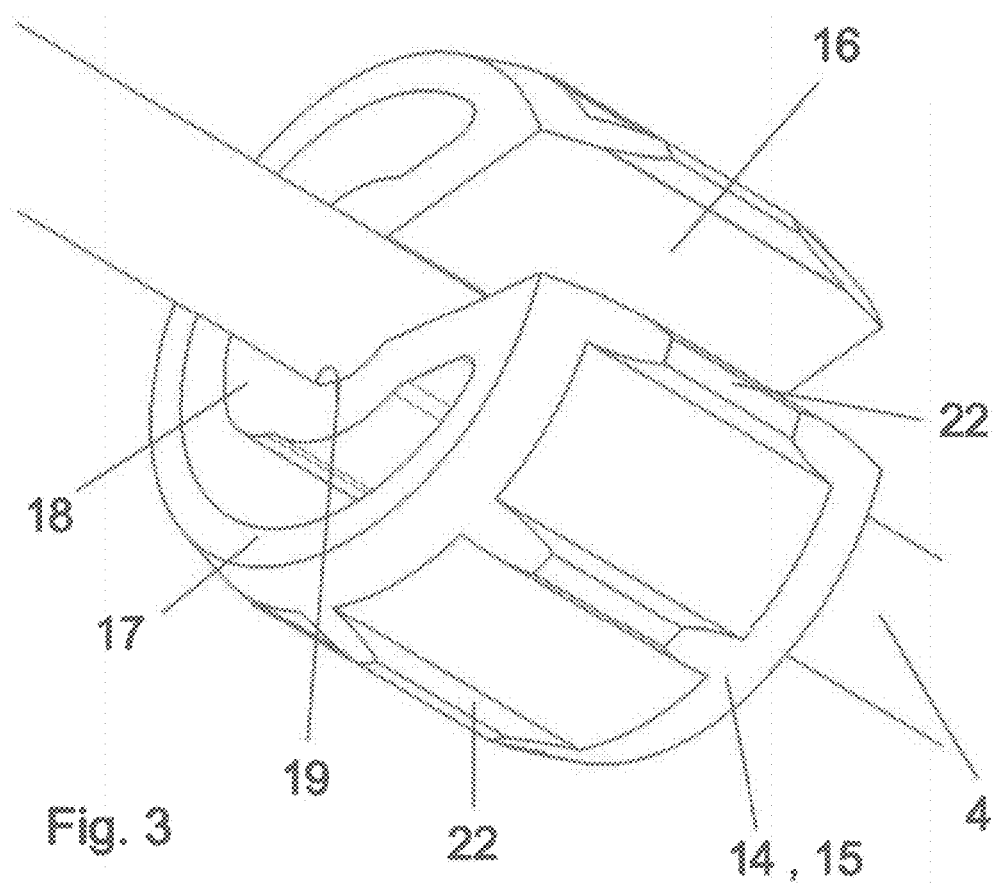
FIG. 3 shows a spatial view of the friction brake of FIG. 2 sitting on a motor shaft.
Figure 4:
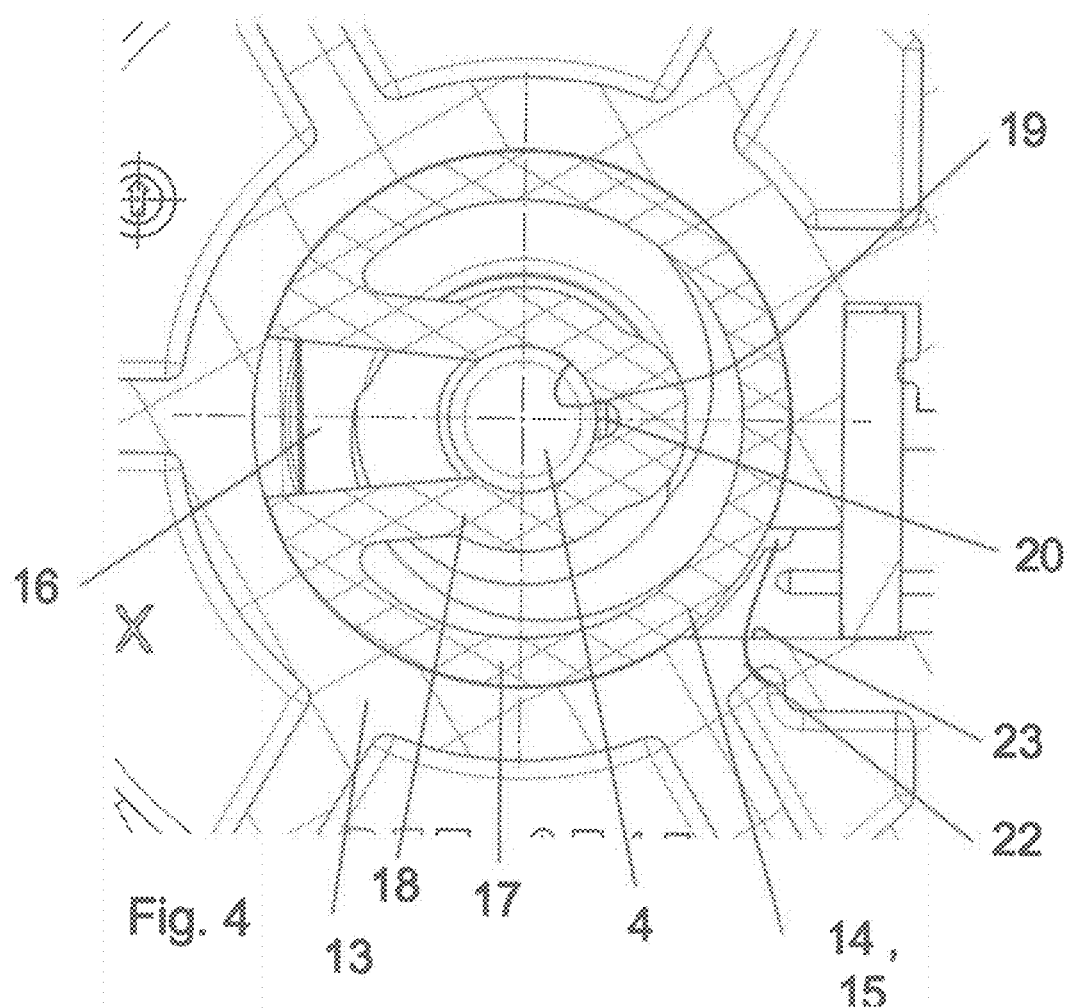
FIG. 4 shows a cross-section through the motor shaft with a side view of the friction brake of FIG. 2.

FIGS. 2 to 4 show in detail the friction brake 14 used in FIG. 1. The friction brake 14 consists of a one-piece brake element 15. The brake element 15 is sleeve-shaped and has a slot-like opening 16 through which the brake element 15 can be clipped onto the motor shaft 4. The sleeve-shaped brake element 15 has an outer wall 17 and an inner wall 18 separated by a circumferential gap. The outer wall 17 merges into the inner wall 18 in the region of the opening 16. The inner wall 18 forms the opening 16 on the inside. The motor shaft 4 thus lies on the inside of the inner wall 18 in contact with the braking element 15. In a first region, the opening 16 has a clear width that is larger than the outer diameter of the motor shaft 4. The opening decreases with depth to a clear width that is smaller than the outer diameter of the motor shaft 4. Towards the end of the opening 16, the contour of the inner wall 18 corresponds to the outer contour of the motor shaft 4 and forms a friction surface 19 for the motor shaft 4. In the end region behind it, the opening 16 tapers abruptly and, when mounted on the motor shaft 4, forms a free space 20 between the motor shaft 4 and the inside of the inner wall 18. The outer wall 17 is annular except for the opening 16 and, in the relaxed state, has an outer diameter which is slightly larger than the inner diameter of the gear housing 13 in the region of the seat of the friction brake. The brake element 15 is made of a heat-stable plastic, in particular polyetheretherketone (PEEK), polyetherketone (PEK), thermoplastic polyimide (TPI), polysulfone (PSU), polyethersulfone (PES), polyphenylene sulfone (PPSU) or polyphenylene sulfide (PPS), and acts as a spring element. For this purpose, the brake element 15 lies with the outer wall 17, as shown in FIG. 4, pretensioned in contact with the inside of the gear housing 13. Due to the selected shape of the inner wall 18, this is pressed around the motor shaft 4 by the pretension and the opening 16 is closed somewhat, which increases the frictional force exerted on the motor shaft 4.

In the region of the friction surface 19, the inner wall 18 has grooves 21 extending in the longitudinal direction on the inside, which serve as a reservoir for lubricant, in particular grease. The outer wall 17 has ribs 22, in particular compression ribs, extending in the longitudinal direction on the outer side, which are evenly spaced along the circumference. In the installed state, the ribs 22 lie in contact with the gear housing 13. The ribs 22 serve firstly to generate the preload of the braking element 15 in the gear housing 13 and secondly as an anti-rotation device. For this purpose, a recess 23 is provided in the gear housing 13, as shown in FIG. 4, in which one of the ribs 22 engages in the mounted state.

The braking element 15 is preferably between 10 mm and 15 mm high in the longitudinal direction, in particular about 12 mm. Such a brake element 15 has the necessary surface area to achieve a large braking effect with a small force. The outer diameter of the motor shaft is in a range between 3 mm and 5 mm and is preferably about 4 mm. The seat in the gear housing preferably has an inner diameter of about 15 mm. The outer diameter of the braking element in the area of the ribs is then somewhat larger, preferably 15.2 mm. The inner diameter of the braking element is somewhat smaller than the outer diameter of the motor shaft, preferably about 1-3 mm smaller. When the motor shaft is at a standstill, sufficient static friction is generated by the braking element 15 to provide the necessary self-locking in the actuator. The brake element preferably applies an additional frictional torque of 0.015 Nm to the motor shaft. The force can be adjusted by the wall thickness of the inner wall and the wall thickness of the outer wall, as well as the overpressing.

Figure 5:
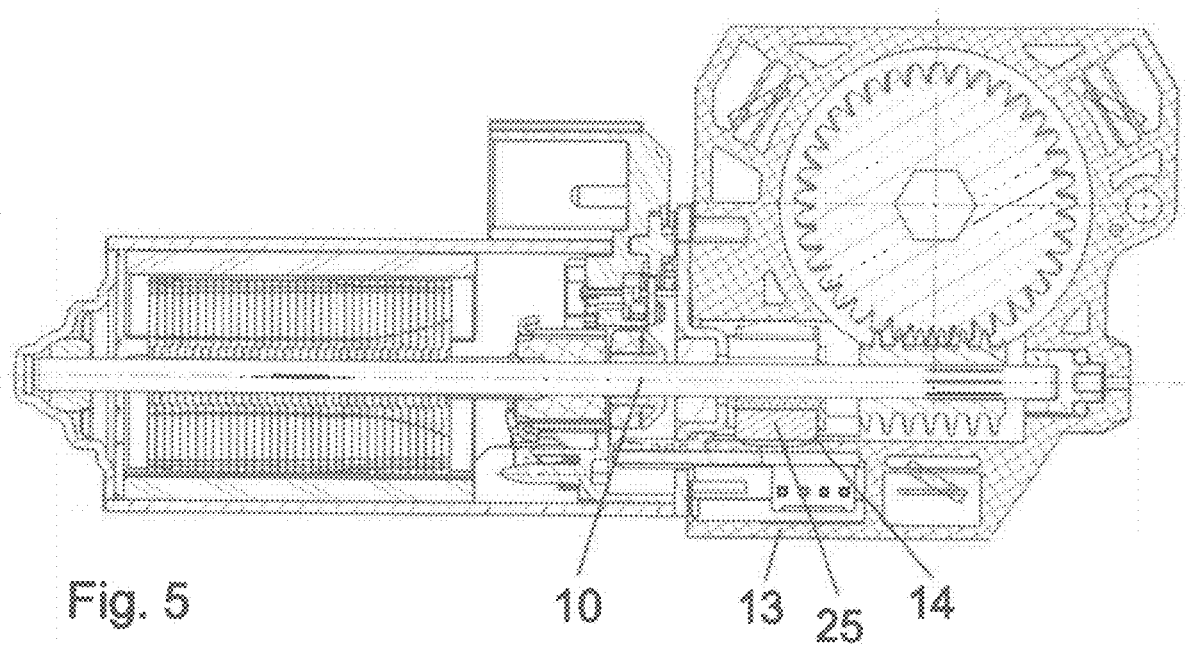
FIG. 5 shows a longitudinal section through an actuator to adjust a height with a two-part friction brake according to an example embodiment of the present disclosure.
Figure 6:
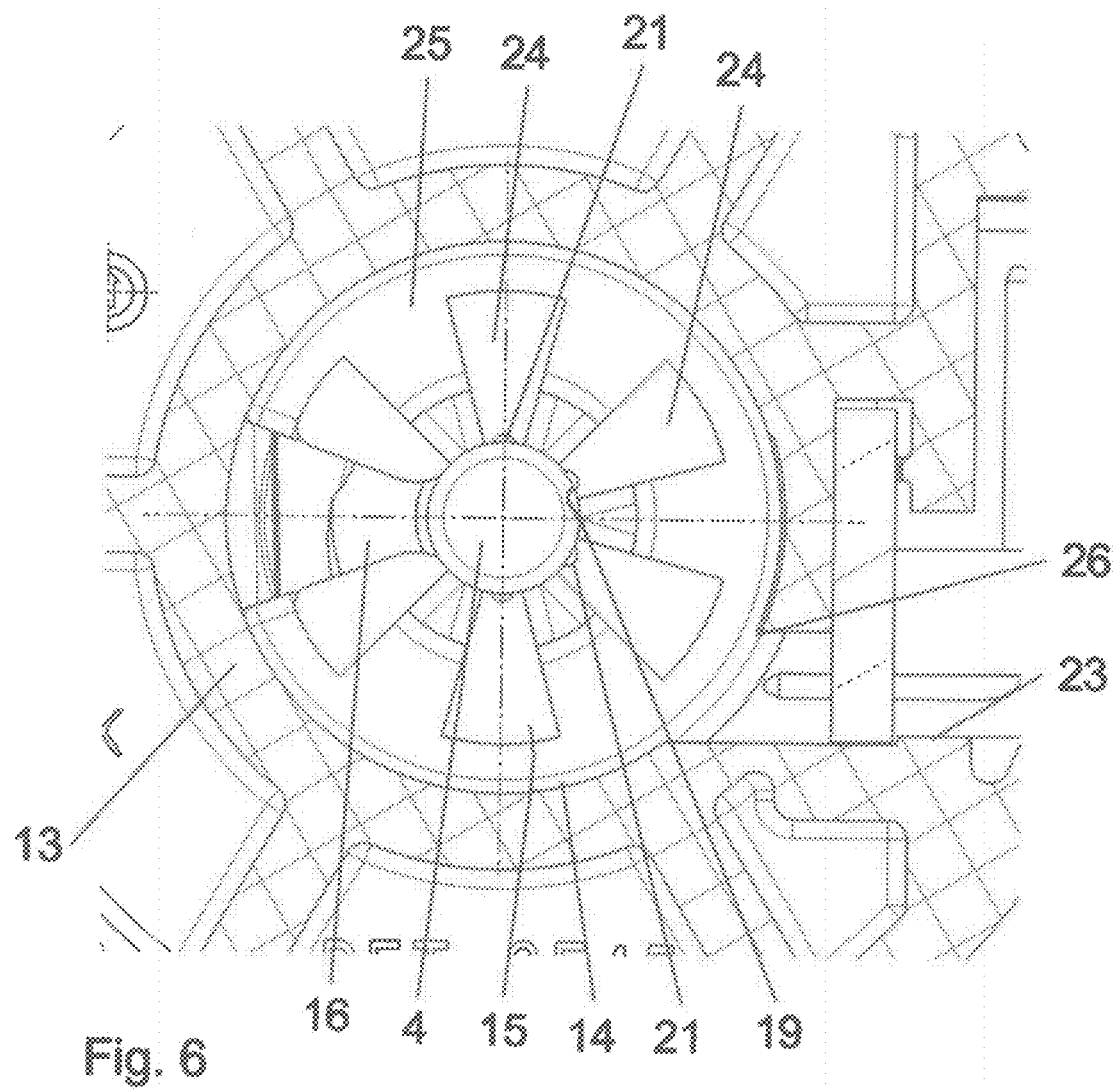
FIG. 6 shows a cross-section through the motor shaft with a side view of the friction brake of FIG. 5.

FIGS. 5 and 6 show a second example embodiment of the friction brake 14. The position and dimensioning of the friction brake 14 as well as the mode of operation are the same as those of the previously described one-piece friction brake 14. The friction brake 14 of FIGS. 5 and 6 is designed in two parts.

The friction brake 14 has a substantially sleeve-shaped braking element 15 made of a heat-resistant plastic, which has a slot-like opening 16 through which the braking element 15 can be clipped onto the motor shaft 4. The opening 16 is formed for this purpose as described above. In the region of the friction surface 19, grooves 21 are also provided here as a reservoir for lubricant. On the outside, the braking element 15 has circumferentially evenly spaced webs 24 which, in cross-section, taper in width in the radial direction from the outside inwards. The brake element 15 is surrounded on the outside by an elastic body 25 which has corresponding recesses. The two components lock together. The elastic body 25 is preferably made of natural or synthetic rubber. The elastic body 25 assumes the spring function of the friction brake 14. For this purpose, the elastic body 25 has an outer diameter which is larger than the inner diameter of the gear housing 13 in the region of the seat, see FIG. 6. The elastic body 25 is also open in the region of the opening of the brake element 16, so that the two end faces of the elastic body in the region of the opening are moved towards each other during assembly, and the elastic body 25 can be inserted into the gear housing 13 with pretension. The elastic body 13 has a projection 26 on the outside, which can be inserted into a recess of the gear housing 23 to form an anti-rotation device during assembly.

The two-piece friction brake 14 thus has the same functionality as the one-piece version, with the elastic body 13 assuming the function of the adjusting spring.

It may also be provided more generally that the friction brake 14 is located at a different position on the motor shaft 4, for example in the vicinity of the bearing 10 facing away from the gearbox.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electromotive actuator to adjust a height, the electromotive actuator comprising:
   an electric motor with a motor shaft;
   a helical gear assembly operatively connected to the motor shaft;
   a sleeve-shaped friction brake to act on the motor shaft; and
   a housing surrounding the electric motor or the helical gearing and including a seat of the friction brake; wherein
   the friction brake includes an opening extending in a radial direction with respect to a longitudinal axis of the motor shaft such that the friction brake is attachable to the motor shaft perpendicular or substantially perpendicular to the longitudinal axis; and
   the friction brake has an outer diameter which is larger than an inner diameter of the housing, in a region of the seat, so that the friction brake is seated under preload in the housing.

2. The actuator according to claim 1, wherein the friction brake includes an anti-rotation device to define a position of the friction brake in the housing.

3. The actuator according to claim 2, wherein the anti-rotation device is on an outside of the friction brake and includes a projection to cooperate with a recess of the housing in the region of the seat.

4. The actuator according to claim 1, wherein the friction brake is at least partially resilient.

5. The actuator according to claim 1, wherein
   the friction brake includes a friction surface which includes longitudinally extending and uniformly spaced grooves in the opening; and
   webs are defined by the grooves with inner sides thereof in contact with the motor shaft and providing a frictional resistance against a rotational driving force of the electric motor.

6. The actuator according to claim 5, wherein lubricant is provided in the grooves.

7. The actuator according to claim 5, wherein the friction brake is defined by a one-piece brake made of plastic.

8. The actuator according to claim 1, wherein the friction brake is in a gear housing and is located between a screw and the motor housing.

9. The actuator according to claim 1, wherein the friction brake is defined by a one-piece brake and an elastic body circumferentially surrounding the brake.

10. The actuator according to claim 9, wherein the brake includes webs on an outside and the elastic body includes corresponding recesses on an inside such that the brake defines a rotationally fixed connection with the elastic body.

11. An electromotive actuator to adjust a height, the electromotive actuator comprising:
    an electric motor with a motor shaft;
    a helical gear assembly operatively connected to the motor shaft;
    a sleeve-shaped friction brake to act on the motor shaft; and
    a housing surrounding the electric motor or the helical gearing and including a seat of the friction brake; wherein
    the friction brake includes an opening extending in a radial direction with respect to a longitudinal axis of the motor shaft such that the friction brake is attachable to the motor shaft perpendicular or substantially perpendicular to the longitudinal axis;
    the friction brake includes a friction surface which includes longitudinally extending and uniformly spaced grooves in the opening;
    webs are defined by the grooves with inner sides thereof in contact with the motor shaft and providing a frictional resistance against a rotational driving force of the electric motor;
    the friction brake is defined by a one-piece brake made of plastic; and
    the brake includes an outer wall and an inner wall which are separated from each other by an air gap, the opening defines the inner wall and the friction surface is on an inner side of the inner wall.

12. An electromotive actuator, to adjust a height, the electromotive actuator comprising:
    an electric, motor with a motor shaft;
    a helical gear assembly operatively connected to the motor shaft;
    a sleeve shaped friction brake to act on the motor shaft; and
    a housing surrounding the electric motor or the helical gearing and including a seat of the friction brake; wherein
    the friction brake includes an opening extending in a radial direction with respect to a longitudinal axis of the motor shaft such that the friction brake is attachable to the motor shaft perpendicular or substantially perpendicular to the longitudinal axis;
    the friction brake includes a friction surface which includes longitudinally extending and uniformly spaced grooves in the opening;
    webs are defined by the grooves with inner sides thereof in contact with the motor shaft and providing a frictional resistance against a rotational driving force of the electric motor;
    the friction brake is defined by a one-piece brake made of plastic; and
    the braking element includes longitudinally extending ribs on an outside which are evenly spaced along a periphery, one of the longitudinally extending ribs defining a projection of the anti-rotation device.

13. A height-adjustable table comprising the actuator according to claim 1.

* * * * *